3,395,001
BRAZED ALUMINUM STRUCTURE AND
METHOD OF MAKING
Philip T. Stroup, New Kensington, C. Norman Cochran, Oakmont, and John J. Stokes, Murrysville, Pa., assignors to Aluminum Company of America, Pittsburgh, Pa., a corporation of Pennsylvania
No Drawing. Filed Oct. 27, 1966, Ser. No. 589,838
8 Claims. (Cl. 29—197.5)

This invention relates to brazing aluminum and to articles useful in such brazing together with the products formed thereby. More particularly, the invention relates to providing for brazing aluminum members without the use of a metal halide salt flux. By aluminum members is meant useful shapes, parts or components made of aluminum or its alloys.

As is generally recognized, aluminum members being brazed, referred to as the parent members, may be joined by an aluminum brazing filler alloy, usually an aluminum-silicon alloy, having a melting point slightly below that of the parent members. Brazing is effected by heating the parent members and the filler alloy to a temperature above the melting point of the latter but short of melting point of the former. The molten filler alloy flows and forms a joining fillet connecting the parent metal members. Some diffusion between parent members and filler alloy occurs and the joint is considered, at least to some degree, to be metallurgically bonded.

Normally an alkali metal halide salt flux, hereinafter referred to as a salt flux, is employed to overcome the oxide coating on the parent metal surfaces and allow the filler metal to wet and flow over these surfaces. This is considered necessary to obtain the capillary flow and uninterrupted fillet formation desired. The amount of salt flux employed is substantial and post-brazing removal of flux residues resulting from such practices is desirable but often difficult. This is especially so in the case of an intricate or complex assembly which tends to retain undesired, corrosive flux residues.

Vacuum brazing without and salt flux has been proposed as one way of alleviating flux residue removal problems. However such processes are marked by certain disadvantages principally attributed to the tenacious oxide film adhering to the metal surface. Even after careful cleaning some of the film is restored before brazing can take place. In most cases this film is not broken or disturbed sufficiently and the bare metallic surface of the parent members cannot be wetted sufficiently by the filler alloy to consistently form joints of good quality.

Accordingly, it is an object of the invention to provide for brazing aluminum or aluminum alloy members without the use of a salt flux. Another object is to provide a brazing filler alloy which permits brazing without such a salt flux.

In accordance with the invention, it has been found that incorporating certain metal additives in the brazing filler alloy or to the parent members being joined, or both, permits brazing without the use of any salt flux. The joints so formed are of the same quality normally associated with furnace brazing employing a salt flux. The metal additives contemplated by the invention are small, but highly effective, amounts of scandium, yttrium and rare earth metals from Period 6 of the Periodic Table of the elements, that is, the Lanthanide series consisting of lanthanum, cerium, praseodymium, neodymium, promethium, samarium, europium, gadolinium, terbium, dysprosium, holmium, erbium, thulium, ytterbium and lutetium. The additives are provided in amounts of 0.0001 to 1%, and preferably within 0.001 to 0.1% by weight. Within these ranges it has been found that the additives enable the brazing alloy to readily wet the bare metal surfaces of the parent members being joined. If the additives are present in less than the designated amounts, the advantages of the invention are not realized. Exceeding the specified ranges offers little, if any, advantage and could introduce undesirable variations in the physical properties of the brazed assemblies.

Noteworthy is the fact that the metal additives, in the amounts specified, can be incorporated into most structural aluminum alloys without disturbing their basic characteristics such as strength, corrosion resistance, etc. The same holds for the brazing filler alloys in that the melting point and other important properties of a given filler alloy are not altered noticeably which permits brazing at normal temperature levels. While it is generally more convenient to incorporate the additives in the filler alloy, the invention is not limited to that technique. Because the amount of the additives employed is rather small, the particular form or purity in which they are provided is not critical. For instance, the common misch metal variety of cerium, or the like, can be used to introduce the desired amount of additive metal. The small amounts of iron or other impurities inadvertently introduced in this way are generally inconsequential, although special cases may dictate otherwise as those skilled in the art will appreciate.

The aluminum parent members may be composed of aluminum or any aluminum alloy adapted to brazing. The aluminum brazing filler alloy can be defined as an aluminum base alloy which melts at a lower temperature than any of the parent members being joined. As is known, most brazing filler alloys for use with aluminum contain at least 75%, by weight, aluminum alloyed with from about 4 to 13% silicon, although copper, in amounts of about 3 to 5%, or zinc, in amounts of about 9 to 11%, or both, may also be included. As is also known, brazing filler alloys are available in a number of forms such as wire, shims, wire rings and brazing sheet. Examples of suitable brazing sheet products comprising an aluminum alloy core and an integral layer of aluminum brazing alloy are provided by the disclosure of U.S. Patent 2,312,039. By way of illustration, brazing sheet laminates commercially available include aluminum filler metal cladding containing 7.5 to 10% silicon, and a core layer of aluminum alloy 3003 (Al, 1.2% Mn) or alloy 6951 (Al, 0.25% Cu, 0.35%, Si, 0.65% Mg). The cladding normally constitutes 5 or 10% of the total thickness. Where brazing sheet is employed, the need for a separate filler metal is generally obviated. The invention contemplates the provision of brazing laminate comprising an aluminum alloy core layer and an integrally bonded aluminum brazing alloy layer containing the metal additives as provided herein. This brazing sheet is highly useful in providing brazed assemblies in accordance with the invention.

Before brazing, the parent members should be cleaned as is customary in the art. Any oil or grease, of course, should be removed. It is preferable, but not absolutely necessary, that the oxide coating in the vicinity of the joint be removed, for example by chemical or mechanical cleaning, particularly where the members were previously heat treated since their oxide coating is especially tenacious because of the furnace exposure. Brushes or chemical etchants are known to serve this purpose. The parts should, if possible, be brazed within 48 hours after cleaning as this tends to minimize any new oxide film accumulation.

After cleaning, the parent members, together with the brazing alloy, are placed together in joining relationship, in the configuration intended to be fixed by the joining operation. They may be held by clamps, jigs or other means known in the art. By joining relationship is meant that the members and filler alloy are positioned in such proximity that the latter can flow at the joint site and form a connecting fillet as is readily understood by those practicing the art. The assembly is then heated to brazing temperature and brazed in the absence of an oxidizing gas, preferably in a vacuum. The vacuum level desired for best results is $2 \times 10^{-5}$ torr or less, meaning an absolute pressure of this level, or a lower absolute pressure such as $1 \times 10^{-6}$ torr. The brazing temperatures are those normally associated with furnace brazing, namely about 1000° to about 1200° F. As is known, brazing temperature is considered to be any temperature which melts the filler alloy but not the parent members, and the term as used herein is intended in that sense. Brazing conditions as just described are maintained for a sufficient time to allow the filler metal to wet, and form a joining fillet connecting, the parent members at the joining site. One to five minutes generally is sufficient. The assembly is then cooled to solidify the filler metal.

Illustrative of the practice of the invention, inverted "T" joints of the type commonly used in the aluminum brazing art to evaluate brazing procedures were made. The brazed structure comprised a horizontal or base member joined to the vertical member by a butt joint with a fillet on both sides of the junction. The vertical member, about ¾" wide, 2" long and 1/16" thick, consisted of aluminum alloy 3003. The horizontal or base member of the same size was fashioned from brazing sheet consisting of 3003 alloy clad with a brazing alloy containing 10% silicon, 0.001% misch metal (70% cerium, balance mainly iron), the remainder being aluminum. The cladding constituted 5% of the total thickness of the horizontal member. The members were assembled in joining relationship with the edge of the vertical member butting against the filler alloy side of the base member cladding on the horizontal member so as to provide a junction 2" long. The assembly was cleaned by immersion in acetone and dried. No etching or mechanical oxide removal was employed in this instance. The assembly was then placed inside a small glass furnace provided with an external electrical resistance heating means. The furnace was evacuated to an absolute pressure of $2 \times 10^{-5}$ torr. As the furnace was being evacuated, the assembly was heated slowly to 1165° F. After five minutes under these conditions the assembly was cooled so that the filler metal could solidify. The brazed assemblies exhibited large continuous and smooth fillets characteristic of good brazed joints.

What is claimed is:

1. The method of brazing aluminum members comprising:
   (1) bringing into joining relationship the joint constituents to provide an assembly which comprises said members together with an aluminum base brazing filler alloy disposed at the joining site, at least one of said joint constituents containing 0.0001 to 1% by weight of at least one metal additive selected from the group consisting of scandium, yttrium and the lanthanide metals from Period 6 of the Periodic Table, the combined total of said additives not exceeding 1%,
   (2) subjecting said assembly to brazing temperature in the absence of an oxidizing gas for a sufficient time to allow said brazing filler alloy to wet, and form a joining fillet connecting, said members at said joining site,
   (3) solidifying said filler metal.

2. The method according to claim 1 wherein at least one said metal additive is included in the aluminum base brazing filler alloy.

3. The method according to claim 2 wherein the aluminum base brazing filler alloy contains from 0.001 to 0.1% of at least one said metal additive.

4. The method according to claim 1 wherein said assembly is subjected to brazing temperature in a vacuum of at least $2 \times 10^{-5}$ torr.

5. A unitary brazing laminate comprising a layer of aluminum base brazing alloy integrally bonded to an aluminum base alloy core layer, said aluminum base brazing alloy containing 0.0001 to 1% by weight of at least one metal additive selected from the group consisting of scandium, yttrium and the lanthanide metals from Period 6 of the Periodic Table, the combined total of said additives not exceeding 1%.

6. The laminate according to claim 5 wherein the aluminum base brazing alloy contains 0.001 to 0.1% of the metal additives, and the combined total does not exceed 1%.

7. A brazed assembly comprising aluminum or aluminum base alloy parent members and an aluminum base brazing filler alloy joining said members, said aluminum base brazing filler alloy containing 0.0001 to 1% by weight of at least one metal additive selected from the group consisting of scandium, yttrium and the lanthanide metals from Period 6 of the Periodic Table, the combined total of said additives not exceeding 1%.

8. The brazed assembly according to claim 7 wherein the aluminum base brazing filler alloy contains 0.001 to 0.1% of the metal additives and the combined total does not exceed 1%.

References Cited

UNITED STATES PATENTS

| 2,602,413 | 7/1952 | Miller | 29—197.5 |
| 2,322,517 | 5/1943 | Miller | 29—197.5 |

HYLAND BIZOT, *Primary Examiner.*